United States Patent [19]

Irwin

[11] Patent Number: 5,026,819

[45] Date of Patent: Jun. 25, 1991

[54] HIGH STRENGTH FIBER OR FILM OF AROMATIC COPOLYAMIDE WITH PENDANT CARBOXYL GROUPS

[75] Inventor: Robert S. Irwin, Wilmington, Del.

[73] Assignee: E. I. Du Pont de Nemours and Company, Wilmington, Del.

[21] Appl. No.: 446,339

[22] Filed: Dec. 5, 1989

[51] Int. Cl.$^5$ .............................................. C08G 69/32
[52] U.S. Cl. ............................ 528/329.1; 264/178 F; 528/182; 528/183; 528/184; 528/331
[58] Field of Search ...................... 528/329.1, 331, 182, 528/183, 184

[56] References Cited

U.S. PATENT DOCUMENTS 3,386,965  6/1968  Huffman et al. ...................... 260/78

OTHER PUBLICATIONS

Hinderer et al., "Aromatic Copolyamides Containing Pendent Carboxyl Groups", *Applied Polymer Symposium*, No. 21, 1-9 (1973).

*Primary Examiner*—Harold D. Anderson

[57] ABSTRACT

The reactivity of aromatic copolyamide fiber and film is enhanced by incorporation of small amounts of 4,4'-diaminodiphenic acid units in the polymer chain.

3 Claims, No Drawings

HIGH STRENGTH FIBER OR FILM OF AROMATIC COPOLYAMIDE WITH PENDANT CARBOXYL GROUPS

BACKGROUND OF THE INVENTION

This invention relates to high strength fibers of p-aramids having pendant carboxyl groups. The presence of these pendant groups imparts properties to the polymer and fibers or films thereof such as would enhance their reactivity, improve adhesion to matrix materials in reinforced composite structures or provide other characteristics.

The commercial importance of fiber reinforced composites has long been recognized. While the adhesion between certain reinforcing fibers and matrix polymer is excellent, others require the use of so-called "coupling agents" in order to improve the level of strength achieved through reinforcement. In some instances the use of coupling agents has not been satisfactory. Poly(p-phenylene terephthalamide) fiber finds extensive use as a reinforcement in composite structures. In accordance with this invention, the introduction of certain monomeric units in specified proportions in the polymer chain may reduce or eliminate the need for coupling agents in particular applications.

SUMMARY OF THE INVENTION

This invention provides a novel polymer of fiber-forming molecular weight consisting essentially of the following repeat units in the indicated molar proportions:

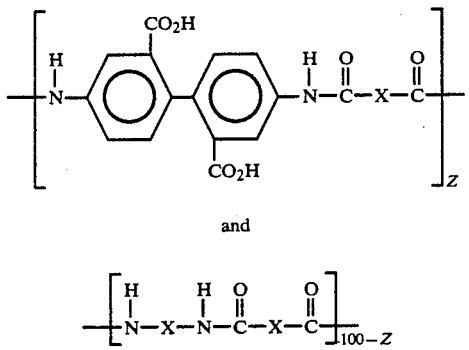

and $$-\left[\begin{array}{c}H \\ | \\ N-X-N-C-X-C \\ | \\ H \end{array}\begin{array}{c} \\ \\ \\ O \\ ||\end{array}\begin{array}{c} \\ \\ \\ O \\ ||\end{array}\right]_{100-z}$$

where X is 1,4-phenylene and where is from about 4 to 30 mole % and fibers and films thereof. Also included is a process for preparing the fibers.

DETAILED DESCRIPTION OF THE INVENTION

The present invention has for its purpose, the incorporation of small amounts of carboxyl groups along an aromatic polyamide chain in a way that they do not interfere with the amide linkages. Carboxyl groups are known to enhance adhesion to rubber, epoxides, etc. It has now been found that fibers formed from certain aromatic polyamides bearing limited numbers of carboxyl groups on the chain suffer no significant reduction in tensile properties. The carboxyl groups may be incorporated by polymerizing a mixture of paraphenylene diamine and 4,4'-diaminodiphenic acid with terephthaloyl chloride. As shown in concurrently filed, copending coassigned U.S. application Ser. No. 446,338 the diphenic acid should be employed as the dihydrochloride.

The novel copolymers of the invention are of fiber-forming molecular weight, having an inherent viscosity of at least 3.5 measured as described below, and consist essentially of the following repeating units:

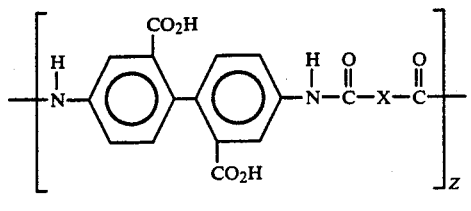

and

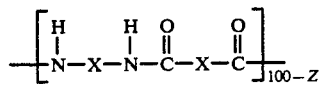

where X is 1,4-phenylene and Z is from 4 to 30 mole %, preferably from 4 to 20 mole %. The copolymer may be made into a spin dope by dissolution in concentrated sulfuric acid. The spin dope should preferably contain at least 15% by wt. of the copolymer. The dope may be spun through an inert fluid layer, preferably air, into a coagulating bath such as water. Preparation of spin dopes and spinning procedures are similar to those employed in Blades U.S. Pat. No. 3,767,756 with poly (p-phenylene terephthalamide).

TEST PROCEDURES

Inherent viscosity, I.V., is defined by the following equation:

$$I.V. = \frac{\ln(RV)}{C}$$

where RV is the relative viscosity and C is the concentration in grams of polymer per deciliter of solvent, typically 0.5 g in 100 ml. (Thus, the units for inherent viscosity are dl/g.) The relative viscosity is determined by dividing the flow time of the dilute solution in a capillary viscometer by the flow time for the pure solvent. The flow times are determined at 30° C. The solvent employed is 100% $H_2SO_4$.

Tensile measurements were made on single filaments following the test procedure found in ASTM D 2101-82. The filaments were conditioned at 21° C. (70° F.) and 65 percent relative humidity and tested on a conventional tensile tester using flat clamps with rubber facing and a 2.5 cm (1") gauge length at a 10%/min strain rate (for low elongation, 0–8%). T is tenacity at break in gpd, M is the initial modulus in gpd and E is the break elongation in %.

The following examples are illustrative of the present invention and are not to be construed as limiting.

EXAMPLE 1

In a flame-dried resin kettle, fitted with cage-type stirrer, thermometer, dry nitrogen purge, and external cooling bath a slurry of 4,4'-diaminodiphenic acid dihydrochloride (3.54 g; 0.0103 mole) with a solution of p-phenylene diamine (21.03 g; 0.195 mole) in anhydrous N-methyl pyrrolidone (407 ml; 420 g)/anhydrous $CaCl_2$ (31.57 g; 0.287 mole) was treated, at room temperature, with anhydrous diethylaniline (3.054 g; 0.0205 mole). To the resulting solution, at 10° C., was added quantitatively, terephthaloyl chloride (41.62 g; 0.205 mole). The initially clear solution in a very sort time gave way to a broken-up gel or crumb. After standing 2 hr at room temperature, this was treated with excess cold water in a blender to precipitate polymer, which was filtered, washed with cold water, then treated in boiling water with stirring for 15 min to remove residual solvent, refiltered and dried at 100° C./15 hr. I.V. in 100% $H_2SO_4$ was 4.08. Thermogravimetric analysis indicated retention of a few percent residual solvent to about 180° C.

A 20% (w/w) solution of the polymer at 68° C. was extruded through a single hole spinneret, with hole diameter 0.13 mm (0.005 in) and length 0.38 mm (0.015 in), via a 6.35 mm (0.25 in) air gap, into a water coagulating bath at 0° C. Fiber was wound up at 256 m/min and spin-stretch factor (S.S.F.) of 9.0X. The well washed, air-dried fiber had T/E/Mi/dpf=17.3 gpd/4.2%/634 gpd/1.5 den. Wide angle X-ray diffraction showed these as-spun fibers to be essentially amorphous. By passing the never-dried fibers through a tube at 200° C. in a nitrogen atmosphere, during 15 sec. under tension, T/E/Mi changed to 20.3/2/8/840. By passage over a hot plate, under tension, at 500° C., T/E/Mi was 18.6/3.2/700 (best break, 21.2/3.9/680).

EXAMPLE 2

A copolymer with an inherent viscosity of 4.68 was prepared in the same way as in Example 1 but with the 4,4,'-diaminodiphenic acid dihydrochloride concentration increased to 6 mole %. Fiber was spun similarly from sulfuric acid solution at 60° C., with a wind-up speed of 221 m/min and spin-stretch of 8.1 X. The air-dried as-spun fiber had T/E/Mi/dpf=15.1/4.3/578/1.8. The fiber was amorphous. Never-dried fiber, heat treated under tension at 200° C./15 sec. had T/E/Mi=20.0/2.5/790. Air-dried fiber, heat treated under tension at 450° C., had T/E/Mi—18.1/4.0/647 (best break, 20.6/4.5/667). Fibers remained amorphous. Heat treatment tended to smooth out the distinct knee in the stress-strain curve of the as-spun fiber.

EXAMPLE 3

A copolymer with an inherent viscosity of 4.53 was prepared in the same way as in Example 1 but with the 4,4,'-diaminodiphenic acid dihydrochloride concentration increased to 12.5 mole %. Fiber was spun from a dope at 79° C. at a wind-up speed of 86 m/min and S.S.F.=2.9 X. Air-dried fiber had T/E/Mi/dpf=10.3/5.1/404/11.2; fibers were amorphous. Never-dried fiber, heated under tension at 200° C. for 15 sec. had a T/E/M=11.0/2.2/600. Air-dried fibers, passed over a hot plate at 400°–500° C. under tension, shows no changed in stress-strain behavior or properties, and no development of crystallinity or improvement in orientation. The stress-strain curve showed a distinct knee or yield point, beyond which modulus dropped by more than 50%.

What is claimed is:

1. Aromatic polyamide of fiber-forming molecular weight consisting essentially of the following repeat units in the indicated molar proportions:

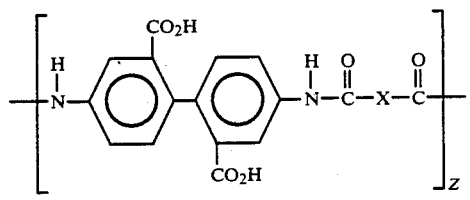

and

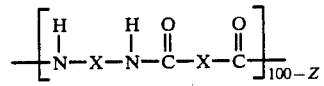

where X is 1,4-phenylene and where Z is from about 4 to 30 mole percent.

2. A polymer according to claim 1 where Z is from about 4 to 20 mole percent.

3. A high strength fiber of the aromatic polyamide of claim 1.

* * * * *